United States Patent
Ryu et al.

(10) Patent No.: US 8,585,921 B2
(45) Date of Patent: Nov. 19, 2013

(54) ELECTRODE MATERIAL CONTAINING POLYVINYL ALCOHOL AS BINDER AND RECHARGEABLE LITHIUM BATTERY COMPRISING THE SAME

(75) Inventors: Minjung Ryu, Seoul (KR); Young-Min Kim, Daejeon (KR); Eun-Suok Oh, Daejeon (KR); SeungRim Yang, Daejeon (KR); Juhyun Kim, Seoul (KR); Ki Woo Chun, Daejeon (KR); ChanHong Lee, Daejeon (KR); Ki-Young Lee, Daejeon (KR); Seo-Jae Lee, Daejeon (KR); JongMoon Jin, Seoul (KR); Taeyeon Kim, Jeonju-si (KR)

(73) Assignee: LG Chem, Ltd. (KR)

( * ) Notice: Subject to any disclaimer, the term of this patent is extended or adjusted under 35 U.S.C. 154(b) by 599 days.

(21) Appl. No.: 11/622,834

(22) Filed: Jan. 12, 2007

(65) Prior Publication Data

US 2007/0264568 A1    Nov. 15, 2007

(30) Foreign Application Priority Data

Jan. 18, 2006 (KR) .................. 10-2006-0005198

(51) Int. Cl.
*H01M 4/13* (2010.01)
*C01B 31/16* (2006.01)

(52) U.S. Cl.
USPC .......................... 252/184; 429/217

(58) Field of Classification Search
None
See application file for complete search history.

(56) References Cited

U.S. PATENT DOCUMENTS

| | | | |
|---|---|---|---|
| 5,792,577 A * | 8/1998 | Ejiri et al. ............... | 429/232 |
| 6,939,644 B2 * | 9/2005 | Aoshima et al. ......... | 429/231.95 |
| 2002/0009646 A1 * | 1/2002 | Matsubara et al. ........ | 429/232 |
| 2002/0016397 A1 * | 2/2002 | Risen et al. ............... | 524/403 |
| 2004/0005501 A1 * | 1/2004 | Nakai et al. ............... | 429/232 |
| 2004/0130038 A1 * | 7/2004 | Murakami et al. ......... | 257/783 |
| 2005/0059778 A1 * | 3/2005 | Yanai et al. ............... | 525/62 |

FOREIGN PATENT DOCUMENTS

| | | |
|---|---|---|
| JP | 11067215 | 3/1999 |
| JP | 11250915 | 9/1999 |
| JP | 2003109596 | 4/2003 |
| JP | 2003157851 | 5/2003 |
| JP | 2004134208 | 4/2004 |
| JP | 2004134369 | 4/2004 |
| JP | 2004247292 A | 9/2004 |
| KR | 1020070072237 | 7/2007 |

OTHER PUBLICATIONS machine translation of JP 2004-247292, retrieved from <http://www19.ipdl.inpit.go.jp/PA1/cgi-bin/PA1DETAIL> on Jun. 24, 2013.*

* cited by examiner

*Primary Examiner* — Cynthia K. Walls
(74) *Attorney, Agent, or Firm* — Lerner, David, Littenberg, Krumholz & Mentlik, LLP

(57) ABSTRACT

Provided is an electrode mix for a secondary battery containing an electrode active material, comprising a PVA having a degree of polymerization of more than 2500 and a degree of saponification of more than 90% as a binder, and a lithium secondary battery comprising the same. Use of the binder according to the present invention can provide advantageous effects such as improved adhesive strength between the electrode mix and current collector and between the electrode mixes, prevention of the peeling and separation of the active material even after repeated charge/discharge cycles, and inhibition of decreases in the capacity or output power retention rate of the secondary battery.

3 Claims, No Drawings

ELECTRODE MATERIAL CONTAINING POLYVINYL ALCOHOL AS BINDER AND RECHARGEABLE LITHIUM BATTERY COMPRISING THE SAME

FIELD OF THE INVENTION

The present invention relates to an electrode mix containing a polyvinyl alcohol as a binder and a lithium secondary battery comprising the same. More specifically, the present invention relates to a lithium secondary battery having superior charge/discharge efficiency and a long-term service life, via the use of a polyvinyl alcohol having a high molecular weight and a degree of saponification within a predetermined range, as a binder for an electrode mix.

BACKGROUND OF THE INVENTION

Technological development and increased demand for mobile equipment have led to a rapid increase in the demand for secondary batteries as an energy source. Among these secondary batteries, lithium secondary batteries having high energy density and voltage are commercially available now. The lithium secondary batteries generally use a lithium transition metal oxide as a cathode active material and a graphite-based material as an anode active material, whereby charge and discharge is performed via the repeated intercalation/deintercalation process of lithium ions from the cathode to the anode or vice versa.

In recent years, a number of studies and suggestions have been focused on anode active materials of metallic materials such as silicon and tin, as they are known to be capable of performing reversible intercalation and deintercalation of large amounts of lithium ions through the reaction with lithium.

Generally, even though there is a difference in the theoretical capacity of the battery depending upon kinds of electrode active materials, the charge/discharge capacity of the battery usually decreases as the charge/discharge cycle is repeated. The primary cause of such a capacity decrease is a failure to sufficiently fulfill functions of the electrode active material due to separation between the electrode active materials and/or between the electrode active material and current collector, resulting from volume changes of electrodes occurring during repeated charge/discharge cycles of the battery. Further, since the lithium ions intercalated into the anode are not sufficiently and smoothly released from the anode during the intercalation and deintercalation process, the active points of the anode are decreased as charge/discharge cycles are repeated. Consequently, a further progress of charge/discharge cycles also leads to decreases in the charge/discharge capacity and life characteristics of the battery.

In particular, when natural graphite having a theoretical discharge capacity of 372 mAh/g is used in admixture with a high-discharge capacity material such as silicon, tin, silicon/tin alloy or silicon/carbon composite, in order to improve the discharge capacity, the repeated charge and discharge cycles lead to significant increases in volume expansion of the electrode materials, which consequently results in separation of the electrode mix from the current collector and thereby a sharp drop of the battery capacity even after several or several tens of cycles.

As such, there is an urgent need in the art for the development of a binder and electrode mix which are capable of achieving a structural stability of the electrode by controlling volume expansion of the electrode active materials which may occur during the repeated charge and discharge cycles, and are thus capable of improving the battery performance.

At present, polyvinylidene fluoride (PVdF), which is currently widely used as a binder of cathode and anode, is a polymer resin soluble in an organic solvent such as N-methyl pyrrolidone (NMP). PVdF was not used as an adhesive at first. However, PVdF is now widely used as a binder of electrode active materials since it exhibits good miscibility with a graphite material and it is possible to manufacture an electrode plate having high adhesive strength by addition of PVdF in an amount of about 8 to 10% of graphite.

However, PVdF covers the electrode active material in the state densely packed with a polymer resin and therefore deteriorates the native performance of the electrode active material in terms of the capacity and efficiency of the battery. In addition, due to poor softness, PVdF is susceptible to cleavage of bonds and deterioration of cycle characteristics, when a material having a large specific surface area and a high expansion/shrinkage rate upon charge/discharge cycling, such as natural graphite or a metallic active material, is used as the electrode active material. Further, PVdF tends to undergo expansion by absorption of a carbonate-based electrolyte, and therefore exhibits a significant decrease of the output capacity as charge/discharge cycles continue to be repeated.

As another type of a binder which is used in lithium secondary batteries, there is rubber-based latex such as styrene butadiene rubber (SBR), as aqueous binder. SBR has high elasticity and is recognized to improve the capacity and initial charge/discharge efficiency of the secondary battery using SBR. However, SBR has relatively low adhesive strength and therefore suffers from limited applications in that SBR cannot be employed in high-capacity active materials such as metallic active materials, undergoing significant volume expansion upon charge/discharge cycling and thus requiring an electrode having high adhesive strength.

Meanwhile, as a further example of a binder for an electrode mix, the use of a polyvinyl alcohol solution has been attempted. However, as can be confirmed from comparative experiments of Japanese Patent Laid-open Publication No. 2003-109596, it is known that the single use of the polyvinyl alcohol is not satisfactory as the binder for the electrode mix due to a low viscosity, non-uniform application of the binder onto metal foil as a current collector, and relatively low adhesive strength. Further, it was confirmed that the use of the polyvinyl alcohol binder suffers from a decreased output power due to a large voltage drop upon performing high-rate charge/discharge and a process disadvantage associated with the heat treatment necessary to improve adhesion between the electrode mix and current collector (Japanese Patent Laid-open Publication No. 2004-134208). Further, it was also confirmed that the use of a polyvinyl alcohol resin disadvantageously exhibits a short high-temperature life of a secondary battery due to a poor electrolyte resistance at a high temperature of 50° C. which is the upper limit of a serviceable temperature (Japanese Patent Laid-open Publication No. 2003-157851).

Despite many teachings that propose the usability of polyvinyl alcohol as the binder, the fundamental reason of difficulty to use the polyvinyl alcohol alone have not yet been fully elucidated. The various attempts and efforts have been made to overcome the limitations as discussed above.

For instance, there have been proposed a variety of technical arts for improving physical properties of the polyvinyl alcohol, by the use of the polyvinyl alcohol in admixture with other polymer resins (Japanese Patent Laid-open Publication Nos. Hei 11-67215, 2003-109596 and 2004-134208), copolymerization of the polyvinyl alcohol with other monomers (Japanese Patent Laid-open Publication No. 1999-250915), modification of the terminal groups of the polyvinyl alcohol (Japanese Patent Laid-open Publication No. 2004-134369), or the like.

In this connection, Japanese Patent Laid-open Publication No. Hei 11-67215 has proposed the use of a water-soluble polymer as a binder for an anode, for example, a polyvinyl alcohol having a degree of polymerization (DP) of 1700. However, the inventors of the present invention have confirmed that the prolonged use of the polyvinyl alcohol having a polymerization degree of 1700 results in severe deterioration of the battery performance due to low electrolyte resistance, and particularly worsening of binder dissolution in the electrolyte upon continuous charge/discharge cycling at a high temperature. The secondary batteries easily reach a high temperature (for example, around 50° C.) during the continuous discharge process and the ensuing significant deterioration of the high-temperature performance may be an obstacle to impede the use of the secondary battery per se. Therefore, despite various suggestions of the conventional prior arts as discussed above, the long-term use of the polyvinyl alcohol as the binder has suffered from severe degradation of the battery performance, the fact of which can also be confirmed in the following examples.

SUMMARY OF THE INVENTION

Therefore, the present invention has been made to solve the above problems and other technical problems that have yet to be resolved.

As a result of a variety of extensive and intensive studies and experiments to solve the problems as described above, the inventors of the present invention have newly discovered that the fundamental reason making it difficult to use a polyvinyl alcohol alone as a binder for an electrode mix is closely correlated with the degree of polymerization and saponification thereof. That is, due to a low viscosity and adhesive strength, the polyvinyl alcohol having the polymerization degree and saponification degree below a predetermined range has a low electrolyte resistance and is incapable of effectively overcoming volume changes of the electrode mix upon charge/discharge cycling, thus confirming that the capacity retention rate of the battery is significantly lowered during repeated charge/discharge cycles and the battery life is thus shortened.

As such, it is one object of the present invention to provide an electrode mix for a secondary battery having superior cycle characteristics and a long-term life even with a single use of a polyvinyl alcohol as a binder. Simultaneously, it is also possible to increase the battery capacity even with use of a small amount of polyvinyl alcohol.

It is another object of the present invention to provide a lithium secondary battery having the improved cycle characteristics, life characteristics and capacity via the use of the above electrode mix. As discussed above, there have been proposed technical arts of using silicon or tin as an anode material in order to enhance the battery capacity, instead of using carbon materials. In this respect, the binder according to the present invention can effectively solve the problems associated with significant volume changes of the battery occurring upon charge/discharge cycling, which were suffered by prior art conventional secondary batteries, and therefore can be applied to broad fields.

DETAILED DESCRIPTION OF PREFERRED EMBODIMENTS

In accordance with an aspect of the present invention, the above and other objects can be accomplished by the provision of an electrode mix for a secondary battery containing an electrode active material, comprising a polyvinyl alcohol (PVA) having a degree of polymerization of more than 2500 and a degree of saponification of more than 90% as a binder.

One of the important features of the present invention is to use PVA having a degree of polymerization much higher than conventionally known PVAs, as a binder for an electrode active material. Additionally, the PVA of the present invention is also required to have a high degree of saponification.

The PVA exhibits superior adhesive strength with the electrode active material as well as a surface of a current collector, via the action of hydroxyl groups which are repetitively present in the main chain of the polymer. Consequently, it is possible to achieve sufficient adhesion of the electrode active material with the current collector surface even by addition of a small amount of the PVA binder, as compared to prior art conventional binders, and it is also possible to provide a relatively high battery capacity and superior cycle characteristics by preventing the separation of the electrode active material from the current collector surface, resulting from the repeated charge/discharge cycles of the battery. Further, due to a higher electrical conductivity than any other polymers, the PVA of the present invention at the same content has a significantly low electrical resistance in the electrode and therefore exhibits superior high-rate charge/discharge characteristics.

As explained hereinbefore, even though many efforts have been made on the use of the polyvinyl alcohol binder through combination of a polyvinyl alcohol with other polymers, copolymerization of the polyvinyl alcohol with other monomers, modification of terminal groups of the polyvinyl alcohol or the like, attempts or suggestions on the single use of polyvinyl alcohol as the binder has suffered from many limitations. One of the causes of such limitations may be the reason that it is not easy to prepare PVA having a degree of polymerization falling within the above-specified range.

However, the polymerization degree of the PVA according to the present invention is higher than 2500 as defined above. PVAs having a degree of polymerization lower than 2500 have disadvantages such as a low electrolyte resistance (i.e., readily soluble in the electrolyte), and partial dissolution in the electrolyte upon charge/discharge cycling of the battery, thereby resulting in an increased resistance of the electrolyte and the peeling of the electrode active material from the current collector, accompanied by a sharp drop of the charge/discharge capacity. Such a decreased resistance to the electrolyte is particularly pronounced when the battery is operated at a temperature higher than room temperature. Even though there is no particular limit to an upper limit for a degree of polymerization, a very high degree of polymerization may result in difficulties associated with the fabrication process of the electrode, due to an excessively high viscosity. Particularly preferred is the polymerization degree of 3500 to 6000.

The degree of saponification of the PVA according to the present invention is 90% or higher, as defined above. If the degree of saponification is lower than 90%, the number of hydroxyl groups is decreased, which may undesirably result in lowering of adhesive strength. The degree of saponification is preferably 98% or higher, more preferably 99.5% or higher.

Generally, a polyvinyl alcohol is prepared by hydrolysis of a polyvinyl alcohol precursor (polyvinyl acetate) obtained from polymerization of vinyl acetate ($CH_3COOCHCH_2$), as shown in Reaction Scheme I below, and Degree of Saponification is defined as a degree of hydrolysis.

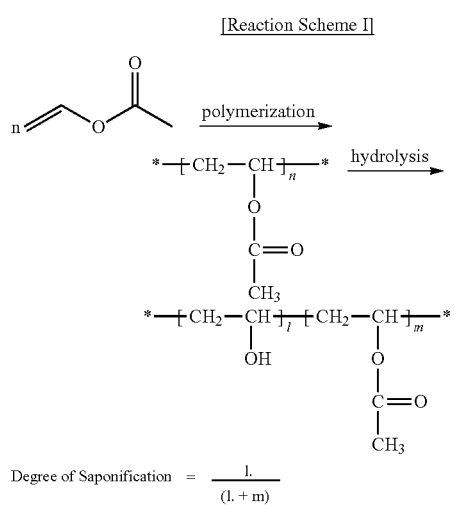

[Reaction Scheme I]

Degree of Saponification = $\dfrac{l}{(l+m)}$

The process for preparing PVAs having a high degree of polymerization and a high degree of saponification is disclosed in Korean Patent Application No. 2005-0136273, assigned to the present applicant, the disclosures of which are incorporated by reference herein in their entirety. The preparation of PVA having a high degree of polymerization and saponification will be briefly described hereinafter.

Distilled water and a predetermined amount of PVA suspension (degree of saponification: 80%) are introduced and stirred in a reaction vessel which is then purged with nitrogen freed of oxygen and moisture. A radical initiator such as azobisbutyronitrile or azobisdimethylvaleronitrile and a vinyl acetate monomer are dissolved and introduced into the contents of the vessel which are then elevated to a predetermined temperature to undergo polymerization, thereby preparing polyvinyl acetate having a high degree of polymerization. The thus-prepared polyvinyl acetate is filtered, washed and dried, and the dried product is dissolved in methanol. The resulting solution is allowed to proceed the saponification reaction by adding a strong base, sodium hydroxide twice, thereby obtaining PVA. The polymerization degree of PVA thus prepared may be adjusted to a desired level within the above-specified range, depending upon an amount of an initiator and a reaction temperature. Therefore, it is possible to obtain the PVA having a saponification degree of 99% or higher.

The electrode active material used in the present invention may be an active material for the anode mix and/or cathode mix. Particularly preferred is an anode active material undergoing large volume changes during charge/discharge cycles.

As examples of the anode active material that can be used in the present invention, mention may be made of carbon and graphite materials such as natural graphite, artificial graphite, expanded graphite, carbon fibers, non-graphitizing carbon, carbon black, carbon nanotubes, fullerenes and activated carbon; metals such as Al, Si, Sn, Ag, Bi, Mg, Zn, In, Ge, Pb, Pd, Pt and Ti, which are alloyable with a lithium metal, and compounds containing such elements; a composite material of a metal or metal compound and a carbon or graphite material; and a lithium nitride.

Among them, more preferred are the carbon-, silicon-, tin-, silicon/carbon-based active materials, which may be used alone or in any combination thereof.

In particular, the PVA binder of the present invention can be more preferably used when it is desired to use, as an anode active material, the silicon-, tin- or silicon/carbon-based active material, which has a high theoretical capacity but undergoes significant volume changes during repeated charge/discharge cycles, thereby suffering limitations in the practical use thereof as the active material.

The electrode mix of the present invention may contain the binder in an amount of about 1 to 30% by weight, preferably 2 to 20% by weight, based on the total weight of the electrode mix. If the content of the binder is too low, it is difficult to achieve desired addition effects. On the other hand, if the content of the binder is too high, this undesirably leads to deterioration in characteristics and performance of the battery, due to an increased resistance of the anode.

When the silicon-, tin- or silicon/carbon-based active material, which undergoes significant volume changes during repeated charge/discharge cycles as discussed above, is used as the anode active material, the content of PVA is preferably 5% by weight or higher.

In addition to the electrode active material and binder, the electrode mix of the present invention may further include a conductive material, a filler and the like, if necessary.

The conductive material is a component having suitable conductivity without causing adverse chemical changes in the fabricated secondary battery and may be added in an amount of 1 to 30% by weight, based on the total weight of the electrode mix. As examples of the conductive materials that can be used in the present invention, mention may be made of conductive materials, including graphite such as natural or artificial graphite; carbon blacks such as carbon black, acetylene black, Ketjen black, channel black, furnace black, lamp black and thermal black; conductive fibers such as carbon fibers and metallic fibers; metallic powders such as carbon fluoride powder, aluminum powder and nickel powder; conductive whiskers such as zinc oxide and potassium titanate; conductive metal oxides such as titanium oxide; and polyphenylene derivatives.

The filler is a component used to inhibit electrode expansion. There is no particular limit to the filler, so long as it does not cause adverse chemical changes in the fabricated battery and is a fibrous material. As examples of the filler, there may be used olefin polymers such as polyethylene and polypropylene; and fibrous materials such as glass fibers and carbon fibers.

In accordance with another aspect of the present invention, there is provided an electrode for a secondary battery which is fabricated by using the above-mentioned electrode mix.

Specifically, the present invention provides an electrode for a secondary battery, which is fabricated by dissolving an electrode mix containing PVA having the above-specified degree of polymerization and saponification and an electrode active material in a solvent to thereby prepare a slurry, and applying the resulting slurry to a current collector, followed by drying.

The electrode for a secondary battery according to the present invention may be fabricated by dissolving 1 to 10% by weight of the binder in a solvent, adding an electrode active material, a conductive material and the like to the resulting solution to thereby prepare an electrode slurry, and applying the slurry to a current collector, followed by drying and pressing.

Examples of the solvent used in preparation of the electrode may include, but are not limited to, organic solvents such as dimethyl sulfoxide (DMSO), N-methyl pyrrolidone (NMP) and ethylene glycol, and distilled water.

The current collector is generally fabricated to have a thickness of 3 to 500 μm. There is no particular limit to the anode current collector, so long as it has suitable conductivity without causing adverse chemical changes in the fabricated battery. As examples of the anode current collector, mention may be made of copper, stainless steel, aluminum, nickel, titanium, sintered carbon, copper or stainless steel having a surface treated with carbon, nickel, titanium or silver, and aluminum-cadmium alloys. Similar to the anode current collector, there is no particular limit to the cathode current collector, so long as it has high conductivity without causing adverse chemical changes in the fabricated battery. As examples of the cathode current collector, mention may be made of stainless steel, aluminum, nickel, titanium, sintered carbon and aluminum or stainless steel which was surface-treated with carbon, nickel, titanium or silver. If necessary, these current collectors may also be processed to form fine irregularities on the surface thereof so as to enhance adhesive strength to the electrode active materials. In addition, the current collectors may be used in various forms including films, sheets, foils, nets, porous structures, foams and non-woven fabrics.

Drying of the electrode slurry may be carried out at a temperature of less than 270° C., preferably less than 150° C. The drying temperature higher than 270° C. leads to rapid decomposition of the polyvinyl alcohol and it is therefore difficult to achieve desired effects of the polyvinyl alcohol as the binder.

In accordance with yet another aspect of the present invention, there is provided a lithium secondary battery comprising the above-mentioned electrode mix.

The lithium secondary battery is comprised of a cathode, an anode, a separator interposed therebetween, and a lithium salt-containing, non-aqueous electrolyte.

Examples of the cathode active material that can be used in the present invention may include, but are not limited to, layered compounds such as lithium cobalt oxide ($LiCoO_2$) and lithium nickel oxide ($LiNiO_2$), or compounds substituted with one or more transition metals; lithium manganese oxides such as compounds of Formula $Li_{1+x}Mn_{2-x}O_4$ ($0 \leq x \leq 0.33$), $LiMnO_3$, $LiMn_2O_3$ and $LiMnO_2$; lithium copper oxide ($Li_2CuO_2$); vanadium oxides such as $LiV_3O_8$, $V_2O_5$ and $Cu_2V_2O_7$; Ni-site type lithiated nickel oxides of Formula $LiNi_{1-x}M_xO_2$ (M=Co, Mn, Al, Cu, Fe, Mg, B or Ga, and $0.01 \leq x \leq 0.3$); lithium manganese composite oxides of Formula $LiMn_{2-x}M_xO_2$ (M=Co, Ni, Fe, Cr, Zn or Ta, and $0.01 \leq x \leq 0.1$), or Formula $Li_2Mn_3MO_8$ (M=Fe, Co, Ni, Cu or Zn); $LiMn_2O_4$ wherein a portion of Li is substituted with alkaline earth metal ions; disulfide compounds; and $Fe_2(MoO_4)_3$, $LiFe_3O_4$ and the like.

When the binder of the present invention is used only in either of the anode or cathode, the binder material for the other electrode may employ, for example polyvinylidene fluoride, carboxymethylcellulose (CMC), starch, hydroxypropylcellulose, regenerated cellulose, polyvinyl pyrrolidone, tetrafluoroethylene, polyethylene, polypropylene, ethylene-propylene-diene terpolymer (EPDM), sulfonated EPDM, styrene butadiene rubber, fluoro rubber and various copolymers.

The separator is interposed between the cathode and anode. As the separator, an insulating thin film having high ion permeability and mechanical strength is used. The separator typically has a pore diameter of 0.01 to 10 μm and a thickness of 5 to 300 μm. As the separator, sheets or non-woven fabrics made of an olefin polymer such as polypropylene and/or glass fibers or polyethylene, which have chemical resistance and hydrophobicity, are used. When a solid electrolyte such as a polymer is employed as the electrolyte, the solid electrolyte may also serve as both the separator and electrolyte.

The lithium salt-containing, non-aqueous electrolyte is composed of a non-aqueous electrolyte and lithium. As the non-aqueous electrolyte, a non-aqueous electrolytic solution, solid electrolyte and inorganic solid electrolyte may be utilized. As the non-aqueous electrolytic solution that can be used in the present invention, for example, mention may be made of non-protic organic solvents such as N-methyl-2-pyrollidinone, propylene carbonate, ethylene carbonate, butylene carbonate, dimethyl carbonate, diethyl carbonate, gamma-butyro lactone, 1,2-dimethoxy ethane, tetrahydroxy Franc, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate and ethyl propionate.

As examples of the organic solid electrolyte utilized in the present invention, mention may be made of polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups. As examples of the inorganic solid electrolyte utilized in the present invention, mention may be made of nitrides, halides and sulphates of lithium such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$ and $Li_3PO_4$—$Li_2S$—$SiS_2$. The lithium salt is a material that is readily soluble in the above-mentioned non-aqueous electrolyte and may include, for example, $LiCl$, $LiBr$, $LiI$, $LiClO_4$, $LiBF_4$, $LiB_{10}C_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carboxylic acid lithium, lithium tetraphenyl borate and imide.

Additionally, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride or the like may be added to the non-aqueous electrolyte. If necessary, in order to impart incombustibility, the non-aqueous electrolyte may further include halogen-containing solvents such as carbon tetrachloride and ethylene trifluoride. Further, in order to improve high-temperature storage characteristics, the non-aqueous electrolyte may additionally include carbon dioxide gas.

EXAMPLES

Now, the present invention will be described in more detail with reference to the following examples. These examples are provided only for illustrating the present invention and should not be construed as limiting the scope and spirit of the present invention.

Preparation Example 1

149 g of distilled water and 1.13 g of a suspension containing 2 wt % of a polyvinyl alcohol (PVA) (degree of saponification: 88%) were introduced and stirred in a reaction vessel equipped with a baffle at 200 rpm. The reaction vessel containing the distilled water and suspension was purged with nitrogen gas containing no oxygen and moisture for 1 hour.

0.05 g of azobisdimethylvaleronitrile was dissolved in 75 g of a vinyl acetate monomer and introduced into the reaction vessel which was then elevated to a polymerization temperature of 30° C. to undergo polymerization. The total reaction time was 10 hours, and the final conversion was 89%. The resulting polymerization products were washed, filtered and dried to obtain polyvinyl acetate. 500 g of a solution of the thus-prepared polyvinyl acetate in methanol (concentration: 10 wt %) was combined with 80 g of a solution of sodium hydroxide in methanol (concentration: 3 wt %) and the mixed solution was subjected to saponification at 40° C. for 1 hour. The solution was filtered and mixed with 460 g of methanol. 120 g of a sodium hydroxide solution in methanol (concentration: 3 wt %) was added to the resulting solution which was then subjected to secondary saponification at 40° C. for 1 hour. The weight-average degree of polymerization for the saponified polyvinyl alcohol was determined by gel permeation chromatography (two Waters Ultrahydrogel™ columns (Ultrahydrogel Linear and 250) connected in series, phosphate buffer, pH 6.7, Polystyrenesulfonate standard), and the degree of saponification thereof was confirmed by $^1$H-NMR analysis. As a result, the degree of polymerization was 4600, and the degree of saponification was 99.5%.

Examples 1 to 3

47.5 g of dimethyl sulfoxide (DMSO) was added to 2.5 g of each binder as listed in Table 1, and the mixture was elevated with stirring to 90° C. over 10 min. The reaction contents were completely dissolved at that temperature for 1 hour and cooled to room temperature, thereby obtaining 5 wt % of binder solutions. The binder solutions were placed on an aluminum tray having a diameter of 7 cm and dried at 130° C. for 5 hours to obtain binder films. According to the procedure of Preparation Example 1, binders were prepared to have a desired degree of polymerization by appropriately adjusting an amount of an initiator and a reaction temperature.

Comparative Examples 1 to 3

Binder films were fabricated in the same manner as in Examples 1 to 3, except that different kinds of binders were used as given in Table 1.

Experimental Example 1

Each binder film fabricated in Examples 1 to 3 and Comparative Examples 1 to 3 was cut into round samples having a diameter of 1 cm and weighed. The samples were each soaked in 10 mL of Electrolyte A (ethylene carbonate:diethyl carbonate:ethyl methyl carbonate in a volume ratio of 4:3:3) and 10 mL of Electrolyte B (Electrolyte A containing 1M LiPF$_6$), then sealed and stored in an incubator at 25° C. and 50° C., respectively. 72 hours later, the films were taken from the electrolyte and the remaining electrolyte on the film surface was wiped with a dry paper, followed by measuring changes in the weight of films relative to the initial weight.

The swelling rate of the films for Electrolyte A was calculated according to the following equation. Regardless of whether the swelling rate has a positive value or a negative value, the film having a lower swelling rate at 50° C. than at 25° C. was regarded as being dissolved in the electrolyte and was estimated as having a poor electrolyte resistance. When the swelling rate of the film was higher at 50° C. than at 25° C., the electrolyte resistance of the films was estimated based on the swelling rate at 50° C., according to the following criteria:

More than 20% swelling: Poor 5 to 20% swelling: Good

Less than 5 swelling: Excellent.

Further, when the swelling rate has a negative value in a soaking experiment for Electrolyte B, the film was regarded as being decomposed by the electrolyte and was estimated as having poor electrolyte resistance.

Swelling rate(%)=(weight after soaking in electrolyte−weight before soaking in electrolyte)/ (weight before soaking in electrolyte)×100

The experimental results thus obtained are given in Table 1 below.

TABLE 1

| | Binder film | Electrolyte | Electrolyte resistance (swelling rate) | | Estimation |
| --- | --- | --- | --- | --- | --- |
| | | | 25° C. | 50° C. | |
| Ex. 1 | PVA-26 | Electrolyte A | 3.57 | 6.91 | Good |
| | | Electrolyte B | 5.76 | 8.54 | |
| Ex. 2 | PVA-40 | Electrolyte A | 1.28 | 2.85 | Excellent |
| | | Electrolyte B | 2.59 | 4.25 | |
| Ex. 3 | PVA-46 | Electrolyte A | 1.25 | 1.64 | Excellent |
| | | Electrolyte B | 1.76 | 2.27 | |
| Comp. Ex. 1 | PVA-18 | Electrolyte A | −3.54 | −7.38 | Poor |
| Comp. Ex. 2 | PVA DS88 | Electrolyte A | 0.88 | 2.91 | Poor |
| | | Electrolyte B | −4.84 | −12.48 | |
| Comp. Ex. 3 | PVdF | Electrolyte A | 17.84 | 25.16 | Poor |

In Table 1, the suffix number of the binders means a degree of polymerization. That is, PVA-26 refers to PVA having a polymerization degree of 2600, and PVA-46 refers to PVA having a polymerization degree of 4600. Unless otherwise specified, PVAs having a degree of saponification of more than 99% were used. PVA DS88 refers to PVA having a polymerization degree of 1700 and a saponification degree of 88%.

As can be seen from Table 1, the PVA binder films of Examples 1 to 3 exhibited a relatively good electrolyte resistance, particularly representing that the electrolyte resistance is better as the degree of polymerization is higher. Therefore, it is recognized that the swelling rate in the electrolyte was significantly reduced in the binder films of Examples 1 to 3, as compared to the PVdF binder film of Comparative Example 3.

On the other hand, it can be seen that the PVA binder film of Comparative Example 1, despite the polymerization degree of 1800 which is relatively lower than that of Examples 1 to 3, was partially dissolved even in Electrolyte A. In addition, it can be seen that the PVA DS88 film of Comparative Example 2 exhibited slight swelling in Electrolyte A containing no LiPF$_6$ salt, but was dissolved in Electrolyte B containing the LiPF$_6$ salt. This is believed to be because non-saponified fractions of PVA were decomposed by the electrolyte salt, as PVA has a low saponification degree of 88% despite the polymerization degree of 1700.

Example 4

95 wt % of natural graphite, 3 wt % of PVA-40 (average polymerization degree: 4000, and saponification degree: more than 99%) as a binder and 2 wt % of a carbon black powder as a conductive material were mixed in DMSO, and stirred for about 15 min to prepare an anode paste. The paste was applied to a thickness of about 250 μm over a copper foil having a thickness of 18 μm, and dried at 130° C. for about 30 min to fabricate an anode.

Example 5

88 wt % of a silicon-carbon composite (Si—C), 10 wt % of PVA-26 (average polymerization degree: 2600, and saponification degree: more than 99%) as a binder and 2 wt % of a carbon black powder as a conductive material were mixed in DMSO, and stirred for about 15 min to prepare an anode paste. The paste was applied to a thickness of about 90 μm over a copper foil having a thickness of 18 μm, and dried at 130° C. for about 30 min to fabricate an anode.

Example 6

An anode was fabricated in the same manner as in Example 5, except that PVA-40 (average polymerization degree: 4000, and saponification degree: more than 99%) was used as a binder.

Example 7

An anode was fabricated in the same manner as in Example 6, except that PVA-46 (average polymerization degree: 4600, and saponification degree: more than 99%) was used as a binder.

Example 8

90 wt % of $LiCoO_2$, 5 wt % of PVA-46 (average polymerization degree: 4600, and saponification degree: more than 99%) as a binder and 5 wt % of a carbon black powder as a conductive material were mixed in DMSO, and stirred for about 15 min to prepare cathode paste. The paste was applied to a thickness of about 250 μm over an aluminum foil having a thickness of 15 μm, and dried at 130° C. for about 30 min to fabricate a cathode.

Comparative Example 4

An anode was fabricated in the same manner as in Example 4, except that 92 wt % of natural graphite, 6 wt % of PVdF as a binder and NMP as a dispersion solvent were used.

Comparative Example 5

An anode was fabricated in the same manner as in Comparative Example 4, except that PVA-18 (average polymerization degree: 1800, and saponification degree: more than 99%) was used as a binder and DMSO was used as a dispersion solvent.

Comparative Example 6

An anode was fabricated in the same manner as in Example 5, except that PVdF was used as a binder and NMP was used as a dispersion solvent.

Comparative Example 7

An anode was fabricated in the same manner as in Example 5, except that PVA-18 was used as a binder.

Comparative Example 8

An anode was fabricated in the same manner as in Example 5, except that PVA DS 88 (average polymerization degree: 1700, and saponification degree: 88%) was used as a binder.

Comparative Example 9

An anode was fabricated in the same manner as in Example 5, except that PVA DS 88/PVdF (3:1, w/w) was used as a binder.

Comparative Example 10

A cathode was fabricated in the same manner as in Example 8, except that PVdF was used as a binder and NMP was used as a dispersion solvent.

Experimental Example 2

Each electrode plate fabricated in Examples 4 to 8 and Comparative Examples 4 to 10 was pressed and cut at an interval of 1 cm, and the adhesive strength to copper foil or aluminum foil was measured by a 180-degree peel test. The test results thus obtained are given in Table 2 below.

Experimental Example 3

Each anode plate fabricated in Examples 4 to 7 and Comparative Examples 4 to 9 was pressed and punched into a round sample having a surface area of 1.49 $cm^2$ which was then used as a working electrode (anode), and a round punched lithium metal foil was used as a counter electrode (cathode), thereby fabricating a coin-type half cell. A separator formed of a porous polypropylene film was interposed between the working electrode and counter electrode, and 1M $LiPF_6$ dissolved in a mixed solvent of ethylene carbonate/diethyl carbonate/ethyl methyl carbonate (volume ratio of 4:3:3) was used as an electrolyte.

In addition, a coin-type half cell was fabricated in the same manner as above, except that each cathode plate fabricated in Example 8 and Comparative Example 10 was pressed and punched into a round sample having a surface area of 1.49 $cm^2$ which was then used as a working electrode (cathode), and a round punched lithium foil was used as a counter electrode (anode).

Test cells thus fabricated were subjected to a charge/discharge test. First, the charge/discharge test was conducted twice at a charge/discharge current density of 0.1 C, an end charge voltage of 5 mV ($Li/Li^+$) and an end discharge voltage of 1 V ($Li/Li^+$). Subsequently, the charge/discharge test was conducted 48 times at a charge/discharge current density of 0.5 C, an end charge voltage of 5 mV ($Li/Li^+$) and an end discharge voltage of 1 V ($Li/Li^+$). Charge of the test cells was conducted according to a constant-current/constant-voltage method, and an end current of constant-voltage charge was set to 0.005 C. After the test of total 50 cycles was finished, the discharge capacity and charge/discharge efficiency (discharge capacity/charge capacity) of the $1^{st}$ cycle were calculated. In addition, a capacity ratio ($50^{th}/1^{st}$) was calculated by dividing the discharge capacity of the $50^{th}$ cycle by the discharge capacity of the 1st cycle and was taken as a capacity retention rate. The test results thus obtained are given in Table 2 below.

TABLE 2

|  | Active material | Binder | Binder weight ratio (wt %) | Adhesive strength (gF/cm) | 1st cycle characteristics Discharge capacity (mAh/g) | Charge/discharge efficiency (%) | Capacity retention rate |
|---|---|---|---|---|---|---|---|
| Ex. 4 | Natural graphite | PVA-40 | 3 | 31 | 342.38 | 89.2 | 75.4 |
| Ex. 5 | Si—C | PVA-26 | 10 | 678 | 2034.46 | 86.5 | 92.5 |
| Ex. 6 | Si—C | PVA-40 | 10 | 1260 | 2176.59 | 88.3 | 92.7 |
| Ex. 7 | Si—C | PVA-46 | 10 | 1978 | 2050.35 | 88.5 | 93.9 |
| Ex. 8 | LiCoO$_2$ | PVA-46 | 5 | 600 | 173.86 | 89.5 | 96.6 |
| Comp. Ex. 4 | Natural graphite | PVdF | 6 | 43 | 338.50 | 84.2 | 63.5 |
| Comp. Ex. 5 | Natural graphite | PVA-18 | 6 | 41 | 335.47 | 89.6 | 64.7 |
| Comp. Ex. 6 | Si—C | PVdF | 10 | 408 | 1822.54 | 78.5 | 88.3 |
| Comp. Ex. 7 | Si—C | PVA-18 | 10 | 398 | 1876.24 | 88.4 | 83.7 |
| Comp. Ex. 8 | Si—C | PVA DS88 | 10 | 496 | 1802.27 | 89.5 | — |
| Comp. Ex. 9 | Si—C | DS88 + PVdF | 10 | 986 | 1928.52 | 86.5 | 82.6 |
| Comp. Ex. 10 | LiCoO$_2$ | PVdF | 5 | 43 | 170.28 | 86.3 | 95.2 |

As can be seen from Table 2, Example 4, using natural graphite as an active material and 3 wt % of PVA-40 as a binder, exhibited excellent adhesive strength even with a smaller amount of a binder, as compared to Comparative Example 4 using 6 wt % of PVDF as a binder. Further, the test results of the coin-type half cell for Example 4 showed relatively high discharge capacity and charge/discharge efficiency, and a significantly improved capacity retention rate at the 50$^{th}$ cycle. Comparative Example 5 showed substantially no improvement of adhesive strength, but exhibited an improved charge/discharge efficiency of the 1$^{st}$ cycle, as compared to Comparative Example 4. However, improvements in the discharge capacity and the capacity retention rate at the 50$^{th}$ cycle were negligible. This is believed to be due to the fact that, when PVA having a low degree of polymerization is used as a binder, the binder is dissolved in the electrolyte as charge/discharge cycles are repeated, and as a result, the active material is separated from the surface of the current collector.

Examples 5 to 7 have employed a metal-based composite (Si—C) as an active material. The metal-based composite active material has a large specific surface area and undergoes large volume expansion upon charge/discharge cycling, as compared to natural graphite. Therefore, when such a metal-based composite is used as the active material, it is generally required to add higher amounts of the binder in order to fabricate an electrode having high adhesive strength. It can be confirmed that the batteries of Examples 5 to 7 exhibit remarkably improved adhesive strength, an improved capacity retention rate at the 50$^{th}$ cycle and particularly significant improvements in the discharge capacity and charge/discharge efficiency of the 1$^{st}$ cycle, as compared to the battery of Comparative Example 6 using PVdF as a binder. These results are believed to be because the high adhesive strength of the PVA binder prevents the separation of the active material from the current collector.

On the other hand, it can be seen that the battery of Comparative Example 7 using PVA-18 as a binder is excellent in the charge/discharge efficiency of the 1$^{st}$ cycle, but has a lower capacity retention rate than the batteries of Examples 5 to 7 using PVA having a high degree of polymerization. These results are believed to be because PVA having a low degree of polymerization exhibits a poor electrolyte resistance and therefore a repeated charge/discharge cycles leads to gradual dissolution of the binder in a carbonate-based electrolyte, which consequently results in the separation of the active material from the surface of the current collector.

As shown in the experimental results of Comparative Example 7 and Examples 5 to 7, it can be confirmed that a higher polymerization degree of PVA leads to higher improvements in the adhesive strength and capacity retention rate and thus the polymerization degree should be more than 2500. That is, when the polymerization degree of PVA is low, the binder is gradually dissolved in the electrolyte and consequently a superior capacity retention rate cannot be achieved.

Meanwhile, the battery of Comparative Example 8 using PVA having a degree of saponification of 88% exhibited superior adhesive strength and charge/discharge efficiency, but showed a poor capacity retention rate. That is, the discharge capacity at the 15$^{th}$ cycle was dropped below 80% of that of the 1$^{st}$ cycle and it was therefore impossible to further progress a test until 50 cycles. It is believed that these results are due to decomposition of the binder by an electrolyte salt contained in the electrolyte, when the saponification degree of the binder is low.

The battery of Comparative Example 9 using a combination of PVA having a saponification degree of 88% with PVdF exhibited improvements of the adhesive strength and capacity retention rate, as compared to the battery of Comparative Example 8 using PVA having a saponification degree of 88% alone. However, it can be seen that it is difficult to achieve a high capacity and a high-capacity retention rate only by simple blending of binders.

For reference, the battery of Example 8 using PVA-46 as a cathode binder exhibited a significant improvement of adhesive strength, as compared to the battery of Comparative Example 10 using PVdF, and also showed slight improvements in battery characteristics. Such improved adhesive strength of the binder enables a reduction of the binder content in the fabrication of the cathode, and particularly can effectively prevent the peeling and separation of the active material from the current collector occurring upon high-temperature cycling of the battery.

INDUSTRIAL APPLICABILITY

As apparent from the above description, an electrode mix for a secondary battery according to the present invention and a lithium secondary battery fabricated using the same employ a polyvinyl alcohol having a high degree of polymerization and saponification within a predetermined range, as an electrode binder. As a result, the present invention provides advantageous effects such as improved adhesive strength between the electrode mix and current collector and between the electrode mixes, prevention of peeling and separation of the active material even after repeated charge/discharge cycles, and suppression of decreases in the capacity or output power retention rate of the secondary battery.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An electrode mix for a secondary battery, the mix comprising:
   (I) an electrode active material; and
   (II) a binder comprising:
      (A) a polymer, the polymer consisting of polyvinyl alcohol (PVA) having:
         (i) a degree of polymerization of 3500 to 6000; and
         (ii) a degree of saponification of more than 99%;
      wherein the polyvinyl alcohol is contained in an amount of 1 to 30% by weight, based on the total weight of the electrode mix; and
      (B) an organic PVA solvent, which is present prior to application of the electrode mix to a current collector.

2. The mix according to claim 1, wherein the electrode active material further comprises an anode active material selected from the group consisting of a carbon-based active material, a silicon-based active material, a tin-based active material, a silicon/carbon-based active material and any combination thereof.

3. The mix according to claim 2, wherein the content of PVA is more than 5% by weight and the anode active material is selected from the group consisting of silicon-based active material, tin-based active material, silicon/carbon-based active material and mixtures thereof.

* * * * *